United States Patent [19]

Yoshida et al.

[11] Patent Number: 5,331,495
[45] Date of Patent: Jul. 19, 1994

[54] THIN FILM MAGNETIC HEAD AND METHODS FOR PRODUCING SAME

[75] Inventors: Satoshi Yoshida, Hachioji; Yoshiaki Kato, Minamiashigara; Joh Ueoka, Hadano, all of Japan

[73] Assignee: Fuji Photo Film Co., Ltd., Kanagawa, Japan

[21] Appl. No.: 713,221

[22] Filed: Jun. 11, 1991

[30] Foreign Application Priority Data

| Jun. 11, 1990 | [JP] | Japan | 2-149886 |
| Jul. 2, 1990 | [JP] | Japan | 2-172728 |
| Jul. 12, 1990 | [JP] | Japan | 2-182589 |

[51] Int. Cl.⁵ .................... G11B 5/31; G11B 5/84
[52] U.S. Cl. ......................... 360/126; 29/603
[58] Field of Search ............... 360/121, 122, 125, 126, 360/127, 119; 29/603

[56] References Cited

U.S. PATENT DOCUMENTS

| 4,458,279 | 7/1984 | Katz | 360/123 |
| 5,056,353 | 10/1991 | Matono | 73/7 |

FOREIGN PATENT DOCUMENTS

| 60-39813 | 3/1985 | Japan . |
| 62-22220 | 1/1987 | Japan . |
| 62-26616 | 2/1987 | Japan . |
| 62-232718 | 10/1987 | Japan . |
| 64-76414 | 3/1989 | Japan . |

Primary Examiner—Robert S. Tupper
Attorney, Agent, or Firm—Sughrue, Mion, Zinn, Macpeak & Seas

[57] ABSTRACT

A thin-film magnetic head comprises a substrate, a magnetic layer, a coil conductor layer, an insulating layer and a protective layer, formed stackwise on the substrate. A portion of the protective layer, which has been formed on pads formed in contiguity to the coil conductor layer for connection to external wiring, is etched by a solution of carboxylic acid, e.g., oxalic or formic acid. Conductor layers are formed by: (a) sequentially forming first and second layers of inorganic materials on the substrate, (b) forming a resist pattern on the inorganic layers, (c) forming a pattern groove by selectively removing the inorganic layers masked by the resist pattern, (d) removing the resist pattern, (e) forming a metal layer on the second inorganic layer and the pattern groove, (f) removing the metal layer overlying the second inorganic layer, except the metal layer deposited in the pattern groove, until the second inorganic layer is exposed, and (g) removing the second inorganic layer. A marker for determining the magnetic gap depth is formed on a lower magnetic layer of the thin-film magnetic head. The marker is originally a polygon corresponding to a triangle at least one apex of which has been removed so as to remove apices of acute angle.

14 Claims, 8 Drawing Sheets

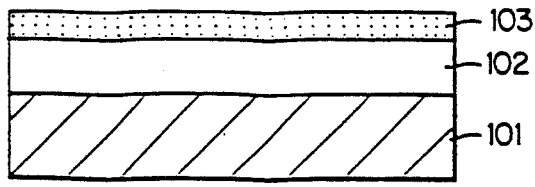
FIG. 4(A)
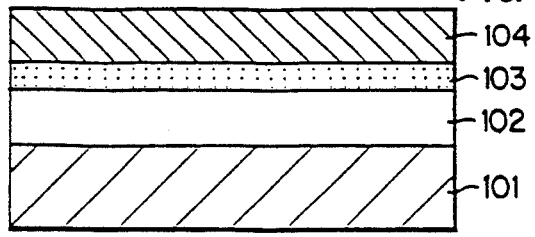
FIG. 4(B)
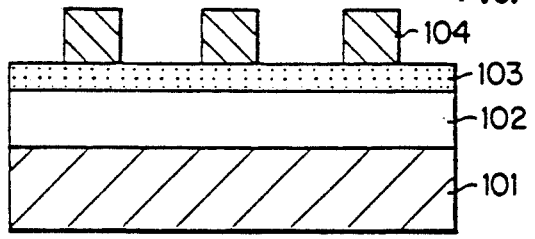
FIG. 4(C)
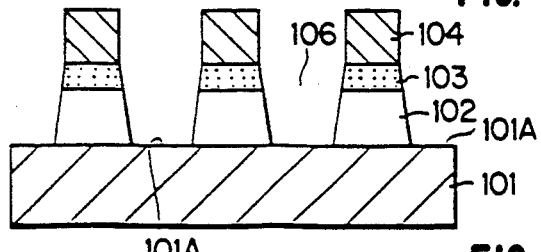
FIG. 4(D)
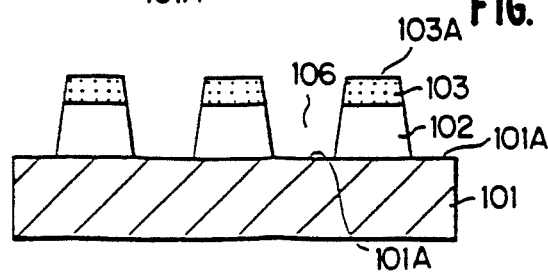
FIG. 4(E)
FIG. 4(F)
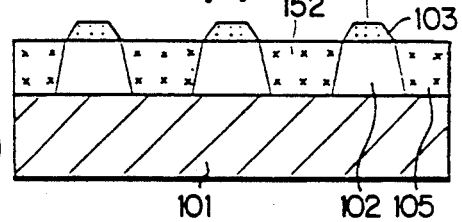
FIG. 4(G)
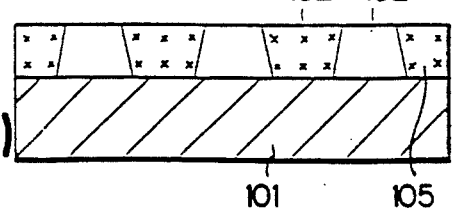
FIG. 4(H)

THIN FILM MAGNETIC HEAD AND METHODS FOR PRODUCING SAME

This application is a substitute specification combining into a single specification the following three applications: Ser. Nos. 713,221 filed Jun. 11, 1991; 715,089 filed Jun. 11, 1991 and now abandoned; and 715,090 filed Jun. 11, 1991 and now abandoned.

FIELD OF THE INVENTION

This invention relates to a method for forming a thin-film magnetic head. More particularly, it relates to a method for removing a protective layer formed in a pad region of a conductor layer of a thin-film magnetic head.

This invention further relates to a method for forming a metal pattern on a substrate, which is particularly useful for the formation of a conductor layer or a magnetic layer for a thin-film magnetic head.

Finally, this invention relates to an improved depth marker for detecting the amount of the depth of the magnetic gap of the thin-film magnetic head employed in a recording/reproducing apparatus constructed in accordance with, for example, pulse code modulation (PCM) systems. According to this aspect of the present invention, a detection marker of a predetermined contour for detecting the amount of the depth of the magnetic gap of the thin-film magnetic head is employed for accurately detecting and facilitating control of the amount of the depth of the magnet gap.

BACKGROUND

Recently, for meeting the demand for a higher recording density in a magnetic storage system, thin-film magnetic heads have been used in increasing numbers, as compared to the bulk type magnetic heads, because of the possibility of size reduction and the superior high frequency characteristics proper to the thin-film magnetic heads.

Referring to FIG. 1, showing the electro-magnetic transducer section of the thin-film magnetic head, except the protective layer, in a plan view, the electro-magnetic transducer section of the thin-film magnetic head includes a magnetic or non-magnetic substrate 1, on which there are formed upper and lower magnetic layers 2 and 6, formed of sendust or amorphous metal, a coil conductor layer 4 of an electrically conductive material, such as Cu, formed by a coil 4a and pads 4b, and an insulating layer of an organic or inorganic material, by conventional film-forming means and fine processing means. A protective layer for mechanically protecting the thin-film magnetic head is formed ultimately for overlying these separate layers.

With the above described electro-magnetic transducer device, signals are transmitted or received between a magnetic gap 9 formed at the distal ends of the upper and lower magnetic films 2 and 6 and a magnetic recording medium, so as to be transmitted and received between the upper and lower magnetic films and the coil 4a and to the pads or terminals 4b connected integrally to the coil 4a. The signals are ultimately transmitted between the pads 4b and an external electronic circuit, not shown.

In the conventional thin-film magnetic heads, the pad portions 4b connected integrally to the coil 4a and functioning as a connection to an external circuitry are once covered in their entirety by the protective layer functioning as the ultimate layer and are subjected to subsequent removal of the protective layer by etching. The etching methods utilized may include, for example, an ion beam etching by an argon gas, a dry etching by reactive etching by a flon based gas, and a wet etching by hydrofluoric acid. There is also proposed a method according to which formation of a thick protective layer is inhibited by a mask and only a portion of the protective layer which cannot be inhibited by the mask is removed by wet etching using hydrofluoric acid.

In addition, the technology of forming a metal layer on a substrate in accordance with a predetermined pattern in the field of thin-film magnetic heads and other electronic devices has received much recent attention. Hence, various attempts have been made for improving the technology.

Referring to FIGS. 3(A) to 3(D), the conventional method for forming the metal pattern is explained with reference to the method for forming a conductor pattern by a lift-off method using a photoresist which is employed in the thin-film magnetic head.

On a substrate 111, the surface of which has been finished to a smooth mirror surface, an insulating layer 112, a first resist layer 113 and a second resist layer 114 are formed step by step. The first and second resist layers 113 and 114 are formed of organic resist materials having different etching rates. Alternatively, only an upper region of the first resist layer may be treated with a suitable chemical to form the second resist layer. This process step is shown at (A) in FIG. 3.

The first and second resist layers 113 and 114 are then selectively removed by etching to form a pattern groove 116 and an exposed surface 112A of the insulating layer 112 on the groove bottom. At this time, the first resist layer 113 is undercut, by taking advantage of the differential etching rates between the first and second resist layers, for forming an overhang 114A in the second resist layer 114 for facilitating the lift-off. This process step is shown at (B) in FIG. 3.

A conductor layer 115 is then formed by a vapor deposition technique like sputtering or vacuum deposition. The conductor layer 115 is formed on the surface of the second resist layer 114 and on the pattern grooves 116 on the exposed surface 112A of the insulating layer 112. The portions of the conductor layer 115 formed on the unetched second resist layer 114 and in the grooves 116, the remaining second resist layer 114 and the unetched first resist layer 113 are then removed step by step by using a suitable etchant, so that a fine metallic pattern composed of the unetched conductor layer 115 is ultimately left on the insulating layer 112 disposed on the substrate 111. Subsequently, another insulating layer is formed in each gap defined between the turns of the conductor layer 115 so that the upper surface of the conductor layer 115 and the upper surface of the distinct insulating layer formed in the gaps will form a continuous flat surface (not shown).

Thus, in a thin-film magnetic head, as recently developed, layer constituting a magnetic head, namely, a lower magnetic layer, a coil conductor layer and an upper magnetic layer, as well as insulating layers interposed between these layers, can be formed by a thin film forming technique, such as sputtering. Thus, a magnetic head superior in mass producibility and uniform in characteristics may be obtained. Also, since patterning is carried out by the photo-lithographic method, it becomes possible to reduce the width of, for example, the recording track or the magnetic gap. Thus, with the above described conventional thin-film magnetic head, the magnetic field taking part in recording becomes steep to enable recording with a high recording density and high resolution, as well as reduction of the size of the magnetic head.

However, with the conventional thin-film magnetic head, it is difficult to increase the number of turns of the coil conductor layers, by reason of its structural constraints, such that, for raising the recording efficiency of the magnetic head, it becomes necessary to reduce the amount of the depth of the magnetic gap to an extremely small value in an order of 10 $\mu$m.

Hence, it is crucial with this type of magnetic head to control the amount of the depth to a predetermined value with high accuracy.

In the conventional practice, shown in FIG. 8, a marker 204' in the form of, for example, a right-angled isosceles triangle for detecting the amount of the depth of the magnetic gap is formed in the thin film magnetic head, and the width l of the marker is measured at a facing surface of the magnetic head adapted to face a magnetic recording medium, referred to hereinafter as "facing surface". The amount of the depth is calculated from the measured value of the width l by mathematical conversion, thereby controlling the amount of the depth.

The marker is formed simultaneously with the coil conductor layer in the vicinity of the magnetic gap by a photo-lithographic technology.

However, the marker in the form of the right-angled isosceles triangle shown in FIG. 8 tends to be deviated from the ideal designed contour shown by a broken line in FIG. 9 due to inaccuracies in resist patterning, marker etching, etc., as a result of which an error ($\Delta L + \Delta L'$) may be produced in the marker width on the facing surface to render it difficult to detect the amount of the depth accurately. Heating after application of a resist pattern layer through a mask is necessary to cause the applied resist to flow in order to round the edge to eliminate stepping which would otherwise cause microcracks due to insufficient step coverage in an overlaid layer at the pattern edge step. This heating entails changes in the marker pattern.

DISCUSSION OF THE RELATED ART AND SUMMARY OF THE DISCLOSURE

In the conventional method for producing a thin-film magnetic head, if the protective layer for the pads is to be removed by dry etching, special bulk equipment including a vacuum tank is required for dry etching, resulting in a rise in production costs. On the other hand, if the protective layer is to be removed by wet etching using hydrofluoric acid, special attention must be exercised in handling the liquid acid, which is highly reactive chemically and is harmful.

It is therefore an object of the present invention to provide a method for producing a thin-film magnetic head in which a protective layer formed in accordance with the above described conventional method for producing the thin-film magnetic head may be removed at as low a cost as possible.

It is another object of the present invention to provide a method for producing a thin-film magnetic head which will endanger the operator to the least extent possible during the etching process and during handling of the etching material.

In accordance with the present invention, there is provided a method for producing a thin-film magnetic head comprising a substrate and at least a magnetic layer, a coil conductor layer, an insulating layer and a protective layer, formed step by step on said substrate by thin-film forming means, said method comprising a step of etching in which a portion of said protective layer which has been formed on pads is formed in contiguity to said coil conductor layer for connection to external wiring by a solution comprising carboxylic ions.

For removing the protective layer, a solution comprising acetic acid, oxalic acid or formic acid containing carboxylic ($COO^-$) ions is used, while an inorganic material, such as $MgO-SiO_2$, $2MgO-SiO_2$, $MgO$, $CeO_2$ or $MgO-SiO_2$-based composition or the $MgO-SiO_2-Al_2O_3$-based composition, is used as a constituent material of the protective layer.

In the method for producing the thin-film magnetic head according to the present invention, which includes a step of removing the portion of the protective layer formed above the pads of the conductor layer by wet etching with the use of a solution containing carboxylic ions, it becomes unnecessary to provide a bulky system such as the vacuum tank required in conventional dry etching systems which make use of an ion beam, with consequent reduction in production costs of the thin-film magnetic head. In addition, as compared with wet etching, which makes use of hydrofluoric acid as an etchant, a solution containing carboxylic ions is used, which is not so acute in its chemical properties and endangers an operator to the least extent possible, so that the etching process and the handling of the material may be facilitated with further reduction in production costs.

Furthermore, in the conventional method illustrated in FIGS. 3(A) to 3(D) for forming a metal pattern, a two-layered pattern consisting of the photoresist layers 113 and 114 formed of separate organic materials is first formed, and a fine metallic pattern, such as the coil conductor layer of the thin-film magnetic head, is then formed by sputtering or vacuum deposition with the aid of the pattern of these photoresist layers.

In general, the photoresist layers of an organic material are inferior in thermal resistance as compared with those of inorganic materials and tend to be affected by the heat applied during film formation by sputtering or vacuum deposition. The pattern contour itself may be changed or, due to heat curing, properties of the resist material and properties of the etching solution tend to be changed. Due to the changes in the pattern contour, the desired metal pattern may not be obtained or, due to the changes in the solutions's properties, removal of the resist layer (lift-off) tends to be incomplete, so that the metallic pattern cannot be formed with the desired accurate contour.

It is therefore an additional object of the present invention to provide an improved method for forming a metallic pattern on a substrate in which the risk of resist pattern changes at the time of sputtering or vacuum deposition as well as the risk of incomplete resist removal due to changes in the properties of the etching solution may be eliminated to enable an accurate fine resist pattern to be formed as well as to facilitate lift-off of the resist layer.

It is another object of the present invention to provide a method for forming a metallic pattern wherein a satisfactory flat surface of the metal layer free of unevennesses may be formed at the time of patterning.

In accordance with the present invention, there is provided a method for forming a metallic pattern on a substrate comprising the steps of:

sequentially forming at least two layers (first and second, or more layers) of inorganic materials on the substrate, forming a resist pattern on said layers of the inorganic materials, selectively removing said layers of the inorganic materials, with said resist pattern as a mask to form a pattern groove, removing said resist pattern, forming a metal layer on the surface of the uppermost of said layers of the inorganic material and on said pattern groove, removing the metal layer overlying the uppermost layer of the inorganic material, except at least a portion of said metal layer deposited in said pattern groove, until at least a portion of the uppermost layer of the inorganic material is exposed, and removing one or more of the layers of the inorganic material inclusive of said uppermost layer (e.g., except for the first inorganic layer).

The layers of the inorganic materials may be formed of oxides, for example, $SiO_2$, $Al_2O_3$, $MgO$, $2MgO-SiO_2$ or $GeO_2$. For selectively removing the layers of the inorganic materials, ion beam etching, wet etching by an acid or reactive etching may be employed. Hydrofluoric acid or carboxylic acids may be employed as a liquid etchant, and flon based gases may be used for reactive etching.

Inorganic materials soluble to carboxylic acids are selected from $MgO-SiO_2$, $2MgO-SiO_2$, $MgO$, $GeO_2$, $MgO-SiO_2$-based composition and $MgO-SiO_2-Al_2O_3$-based composition, and such materials are preferred for the second inorganic material layer (lift-off layer). Inorganic materials insoluble to carboxylic acids are preferably used as the first layer, which are selected from $SiO_2$, $SiO$, $Al_2O_3$ or the like.

If $SiO$ or $SiO_2$ is used as an inorganic material, hydrofluoric acid is preferred as the etchant, whereas, if $2MgO-SiO_2$ (forsterite) is used as an inorganic material, carboxylic acids (acetic, oxalic and/or formic acids) are preferred as the etchant.

Since the resist layer is already removed at the time of formation of the metal layer, there is no risk that the pattern groove defined by the layer of the inorganic material be changed in profile due to heat generated during formation of the metal layer, or lift-off be rendered difficult, so that there is no risk that the metal pattern be changed in profile or that the metal patterning become impossible to perform due to the heat generated at the time of formation of the metal layer.

Among the examples of the metal patterns produced in accordance with the present invention are a pattern of the coil conductor layer in a thin-film magnetic head, a pattern for the lower magnetic film or the upper magnetic film of the thin-film magnetic head and metal conductor patterns for a variety of solid-state electronic devices.

In a method for forming a metal pattern on a substrate according to the present invention, there is no risk of unstable lift-off being produced or the pattern profile being changed due to the use of the photoresist as an organic material, contrary to the case of the conventional metal pattern forming method, but patterning may be achieved with stable lift-off and with the least changes in profile, so that a fine metal pattern may be formed.

Also, in accordance with the present invention, ultimate flattening of the conductor layer may be achieved through the process steps, without the risk of forming unevennesses on the metal layer surface. In this manner, a process subsequent to the present metal pattern forming process may be facilitated.

Finally, it is another principal object of the present invention to provide a thin-film magnetic head wherein errors due to inaccuracies in the resist patterning or the pattern etching may be eliminated to enable accurate detection and to facilitate control of the amount of the depth of the magnetic head.

In view of this object, the present invention also provides a thin-film magnetic head comprising a lower magnetic layer, a coil conductor layer disposed on said lower magnetic layer, an upper magnetic layer constituting a magnetic circuit in cooperation with said lower magnetic layer, and insulating layers insulating said layers one from the other; further comprising a marker for determining the amount of the depth of a magnetic gap of the magnetic head, said marker being in the form of a polygon corresponding to a triangle at least one apex of which is cut off along an arc of a circle or a straight line. Preferably, the marker is formed on the lower magnetic layer as the same layer as the coil conductor layer.

By thus forming the depth marker on the lower magnetic layer as the same layer as the coil conductor layer with the contour of a polygon produced by eliminating at least one apex of a triangle along a straight line or an arcuate line, any adverse effects caused by errors due to inaccuracies in the resist patterning and pattern etching may be obviated to enable the amount of the depth of the magnetic head to be detected with higher accuracy.

Thus, the present invention provides a thin-film magnetic head in which the amount of the depth of the magnetic gap may be detected with improved accuracy through the use of a specific depth marker for detecting the amount of the depth of the magnetic gap which is not changed in contour by pattern etching of the depth marker.

Further objects, features and advantages will become apparent from the remaining disclosure with reference to the accompanying Drawings.

BRIEF DESCRIPTION OF THE DRAWINGS

FIGS. 2(a) to 2(c) are cross-sectional views showing an electro-magnetic transducer of a thin-film magnetic head for illustrating a method for producing a thin-film magnetic head embodying the present invention and particularly illustrating the state of removal of a protective layer overlying pads of a coil conductor, wherein FIGS. 2(a), 2(b) and 2(c) show the state before formation of the protective layer, after formation of the protective layer and after removal of the portion of the protective layer overlying the pads, respectively.

FIGS. 4(A) to 4(H) are cross-sectional views showing various layers which are formed or removed in the course of carrying out the method for forming a metal pattern on a substrate in accordance with the present invention, with the process steps being shown in the order in which they are performed.

DESCRIPTION OF THE PREFERRED EMBODIMENT

Figure 1:
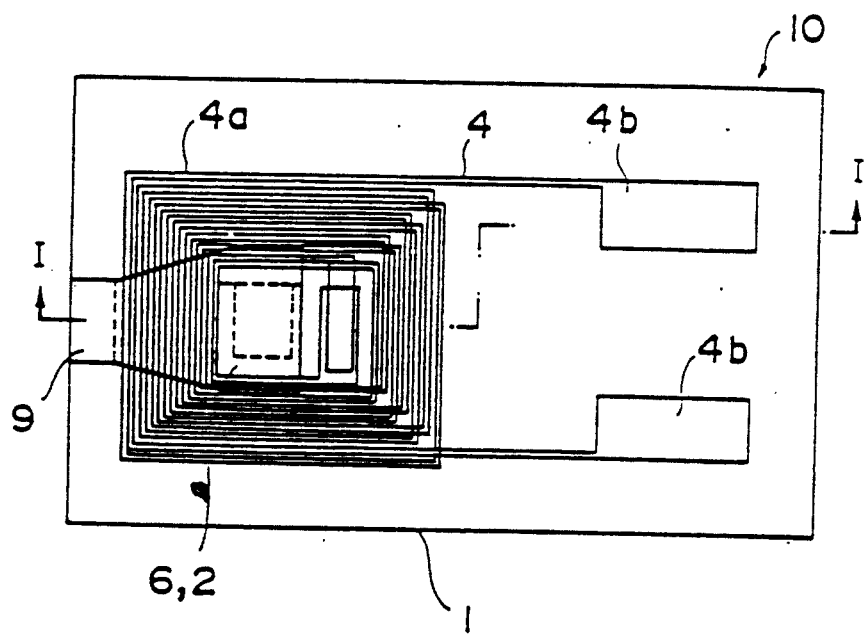
FIG. 1 is a schematic plan view of an electro-magnetic transducer section, shown with a protective layer removed, for showing the construction of a conventional thin-film magnetic head and the inventive thin-film magnetic head.
Figure 2A:
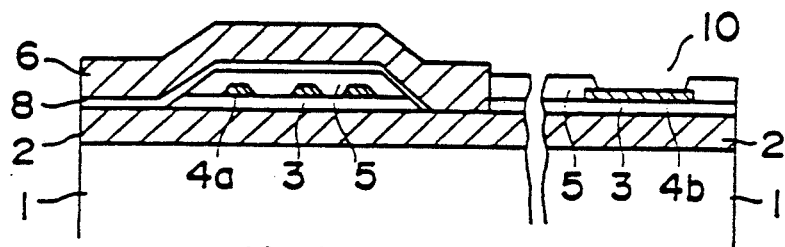
Figure 2B:
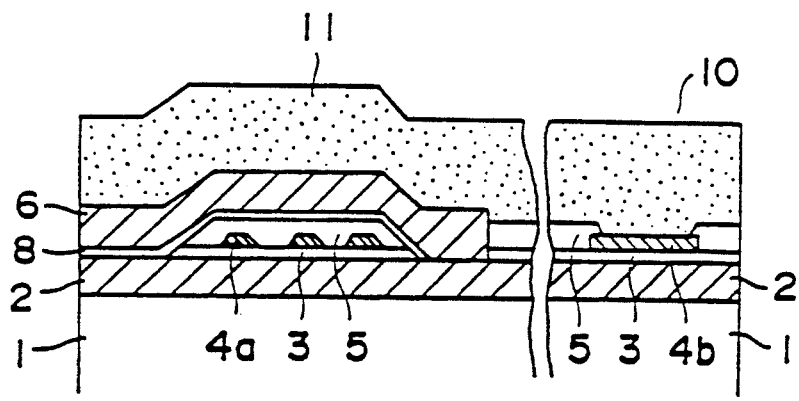
Figure 2C:
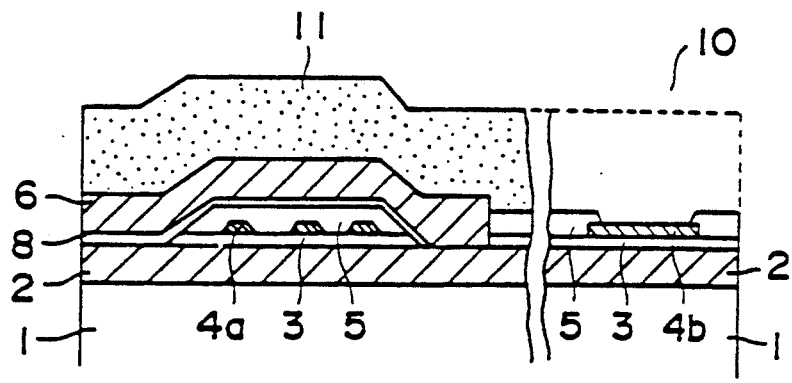

Referring to FIG. 2, the manner of removal of a protective layer in the method for producing a thin-film magnetic head embodying the present invention will be explained. FIGS. 2(a) to (c) are cross-sectional views taken along line I—I of FIG. 1 and showing the steps of the present method for producing the thin-film magnetic head before the formation of the protective layer, after the formation of the protective layer and after removal of the portion of the protective layer which overlies the pads, respectively.

Referring to FIG. 2(a), a lower magnetic layer 2 is formed by sputtering on a substrate 1. An insulating layer 3, a coil conductor layer 4, an insulating layer 5, a gap layer 8 and an upper magnetic layer 6 are formed step by step as thin films and patterned in accordance with a predetermined contour, respectively.

The coil conductor layer 4 is formed by a coil part 4a and pads 4b which are formed simultaneously with and in contiguity to the coil part and which are constructed as terminals for connection to external lead wires. After completion of the thin-film magnetic head, the pads 4b are connected to external wiring and function as external terminals by means of which the signal voltage generated at the coil conductor layer 4a is transmitted to external circuitry.

Directly after formation as a layer by vacuum deposition or sputtering, the insulating layer 5 is subjected to patterning by an ion beam process for forming a magnetic gap layer of a predetermined contour. It is noted that the portion of the insulating layer 5 which has been formed on the pads 4b is simultaneously removed at the time of this patterning.

The protective layer 11 is then formed to overlie the electro-magnetic transducer section of the thin-film magnetic head 10 in its entirety. The protective layer 11 is formed by an inorganic material readily soluble in a solution containing COO$^-$ ions, such as 2MgO—SiO$_2$ (forsterite), and has a thickness on the order of, for example, 45 μm, which is considerably larger than that of the remaining layers, in order to meet the requirements for mechanical strength. This insulating layer is formed by, for example, sputtering (FIG. 2(b)). The sputtering of forsterite layer is preferably carried out in a mixture gas of Ar and oxygen in order to make the layer readily soluble to the etchant containing carboxylic ions such as oxalic acid or formic acid. The 2MgO—SiO$_2$ (forsterite) layer may be formed by sputtering in a mixture gas atmosphere of inert gas (e.g., Ar) and a minor amount of oxygen (e.g., 5%) under a reduced pressure (e.g., total pressure of about 0.4 Pa).

A photoresist layer, not shown, is then applied to the surface of the protective film 11, and patterned by light exposure or development, in a known manner, for removing only that portion of the photoresist layer which has been applied to the pads 4b and the neighboring region in accordance with the contour of the pads 4b. Using the remaining photoresist layer as the mask, only the protective layer 11 overlying the pads 4b is removed by an oxalic acid solution which is one of the COO$^-$ ion containing solution for forming a window, not shown, for connection to an external lead wire, on the portion of the protective layer 11 overlying the pads 4b. Subsequently, the residual photoresist layer on other portions is removed by any conventional method (FIG. 2(c)). A wiring, not shown, functioning as an external lead wire, is bonded to the pads 4b.

In the above described method for producing the thin-film magnetic head, 2MgO—SiO$_2$ is used as a material constituting the protective layer. However, besides this material, MgO—SiO$_2$-based compositions, such as MgO—SiO$_2$, MgO—SiO$_2$—Al$_2$O$_3$-based compositions, MgO or GeO$_2$ may also be employed as the material of the protective layer. In addition, any other materials soluble in a solution containing COO$^-$ ions may be employed.

As the COO$^-$ ion containing solution, solutions of acetic acid, oxalic acid and formic acid may be employed, any of which is harmless and not acute in chemical properties as compared to hydrofluoric acid, which is an inorganic acid hitherto used for removing the protective layer. It therefore becomes unnecessary to exercise as meticulous attention during the etching process and handling of the etching materials as that required in the case of hydrofluoric acid.

An additional preferred embodiment of the present invention will be explained by referring to FIG. 4. The following explanation is made of the method of forming a conductor layer pattern in a thin-film magnetic head, as a typical example of the method of forming a metal pattern, and in the order of the steps shown in FIGS. 4(A)–4(H).

In FIG. 4(A), 101 denotes a substrate on which a first layer of an inorganic material 102, herein SiO$_2$, is formed to a thickness of, for example, 3 μm, by sputtering, and a second layer 103 of an inorganic material, herein 2MgO—SiO$_2$, is formed on the first layer (in a thickness of 2 μm, as an example). The 2MgO—SiO$_2$ (fosterite) layer may be formed by atmosphere of an inert gas (e.g., Ar) and a minor amount of oxygen (e.g., 5%) under a reduced pressure (e.g., total pressure of about 0.4 Pa).

A photoresist, which is to be a resist layer 104, is then formed on the above mentioned layers of the inorganic material (FIG. B-2(B)). The photoresist layer 104 is formed of an organic material and may be of the negative type or the positive type. In the present embodiment, the thickness of the photoresist layer 104 is about 7 μm.

Figure 3A:
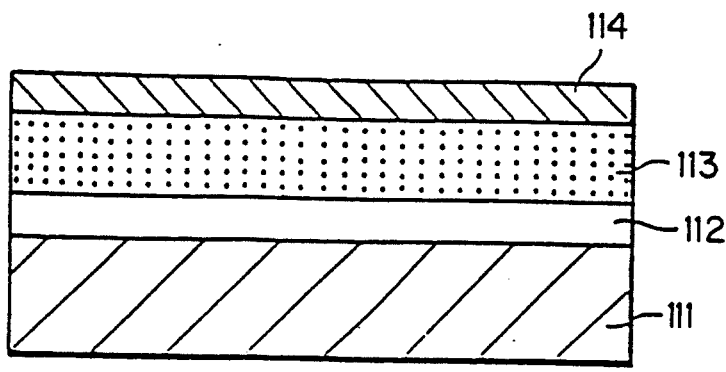
FIGS. 3(A) to 3(D) are cross-sectional views, analogous to FIGS. 4(A) to 4(H) but illustrating the conventional method for forming a metal pattern.
Figure 3B:
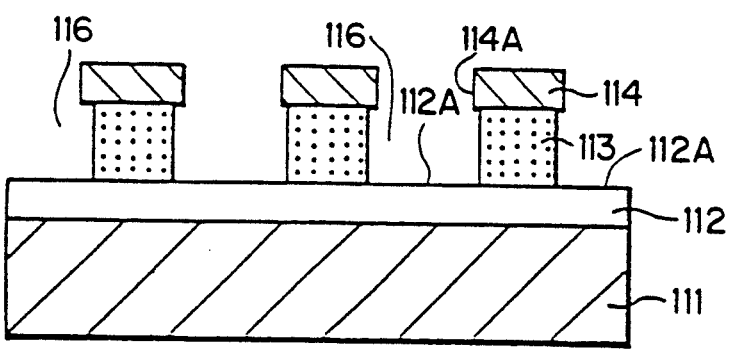
Figure 3C:
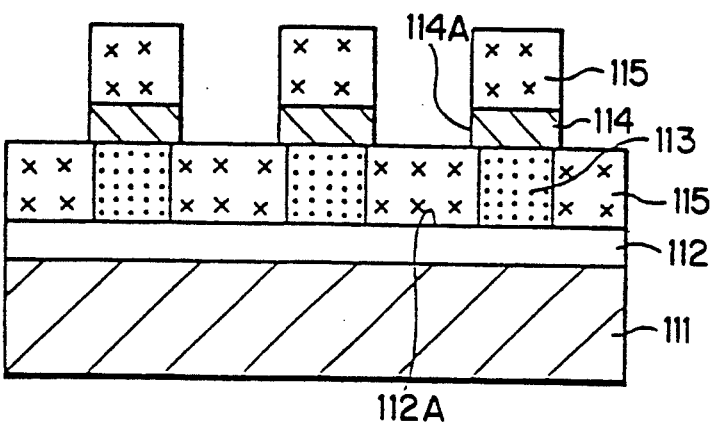
Figure 3D:
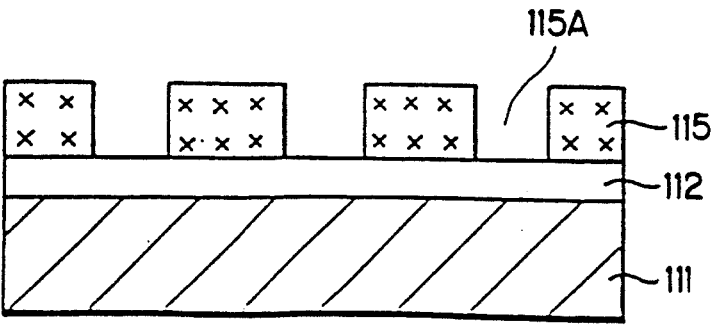

The resist layer 104 is pre-heated to about 100° C. for stabilization, and a predetermined mask pattern is then transferred thereto by light exposure. The resulting mask pattern is subjected to wet treatment by a liquid etchant for patterning, as conventionally (FIG. 3(C)).

After termination of the patterning of the resist layer 104, the layers 102 and 103 are patterned by, for example, ion beam etching, using the resist layer 104 as the mask pattern. A pattern groove 106 is formed in this manner, and an exposed surface 101A is formed on the substrate 101 on the bottom of the groove 106. At this time, reactive etching by flon based gases may be employed for patterning. Alternatively, etching may be performed by a wet system using suitable etchants for the inorganic material, such as hydrofluoric acids for $SiO_2$ as the inorganic material of the first layer and carboxylic acids for $2MgO—SiO_2$ as the inorganic material of the second layer.

When the patterning of the second layer 103 and the first layer 102 is terminated, as shown in FIG. 4(D), the resist layer 104 is removed by using an etchant, such as acetone, for exposing the surface 3A of the second layer 3, as shown in FIG. B-3(E). A conductor layer 5 of, for example, Cu, is formed on a surface 103A of the second layer 103 and in the groove 106 on the partially exposed surface 101A of the substrate 101, to a thickness of 3 μm, which is the same as the thickness of the first layer 102, so that conductor layers 151 and 153 are formed on the surface 103A of the second layer 103 and a conductor 152 is formed in the groove 106 (FIG. 4(F)). The conductor layer 105 is formed by sputtering or vacuum deposition.

The conductor layers 151 and 153 on the surface 103A of the second layer 103 are etched by using, for example, an ion beam process. The conductor layer 151 is etched by an ion beam irradiated from directions a and b inclined at a predetermined angle α with respect to a perpendicular line n drawn to the substrate surface. An ion beam incident angle α is selected to be approximately 75°, so that the conductor layer 151 formed on the surface 103A of the second layer 103 and the conductor layer 153 formed above the height of the first layer 102, as indicated by broken lines in FIG. 4(F), are etched off. It is noted that the conductor layer 152 deposited in the groove 106 on the exposed substrate surface 101A is screened from the ion beam by the conductor layer 151 above the second layer, the second layer 103 and by the conductor layer 153, remaining partially after removal of the conductor layer 151, so that the conductor layer 152 is left intact immediately before the final step, and is slightly etched during the final step, thus presenting a flat surface.

When the ion beam etching of the conductor layers 151 and 153 proceed so that the surface of the insulating layer 102 is partially or wholly exposed, as shown in FIG. 4(G), the ion beam etching is terminated. The second layer 103 is then removed, such as by wet etching, as shown in FIG. 4(H). As an etchant, such etchant capable of selectively removing the second layer without attacking or otherwise adversely affecting the conductor layer, such as an acid containing carboxylic ($COO^-$) ions, such as oxalic-, acetic- or formic acid, is preferably employed.

After the second layer 103 has been removed, the first layer 102 and the conductor layer 105 are left to substantially the same thickness and formed as a flat surface. In this manner, as distinguished from the conventional metal pattern forming process, there is no necessity for forming a separate insulating layer between the conductor layers, while there is no necessity for providing a flattening process subsequent to the metal pattern forming process of the present invention.

While the ion beam incident angle α is selected to be 75° in the present embodiment, an angle Θ of the inclined surface of the second layer is preferably 75° or less. That is, it is preferred that the angle Θ for the inclined surface of the second layer and the ion incident angle α satisfy the formula (1).

$$\Theta \leq \alpha \qquad (1)$$

With the above described method, since the organic resist material of the resist layer 104 is already removed at the time of sputtering of the conductor layer 105, there is no risk that the pattern profile in the resist layer or the dissolution properties with respect to the liquid etchant be changed at the time of sputtering, contrary to the case of the conventional method.

On the other hand, the conductor layer and the layer of the inorganic material are on the same flat horizontal plane, without producing unevenness on the surface of the conductor layer, contrary to the case of the conventional method. In sum, a fine metal conductor pattern with a very narrow interval of inorganic insulating layer pattern results.

Although the two layers of the inorganic materials are used in the present embodiment, similar meritorious effects may naturally be produced with the use of more than two layers of the inorganic materials.

Figure 8:
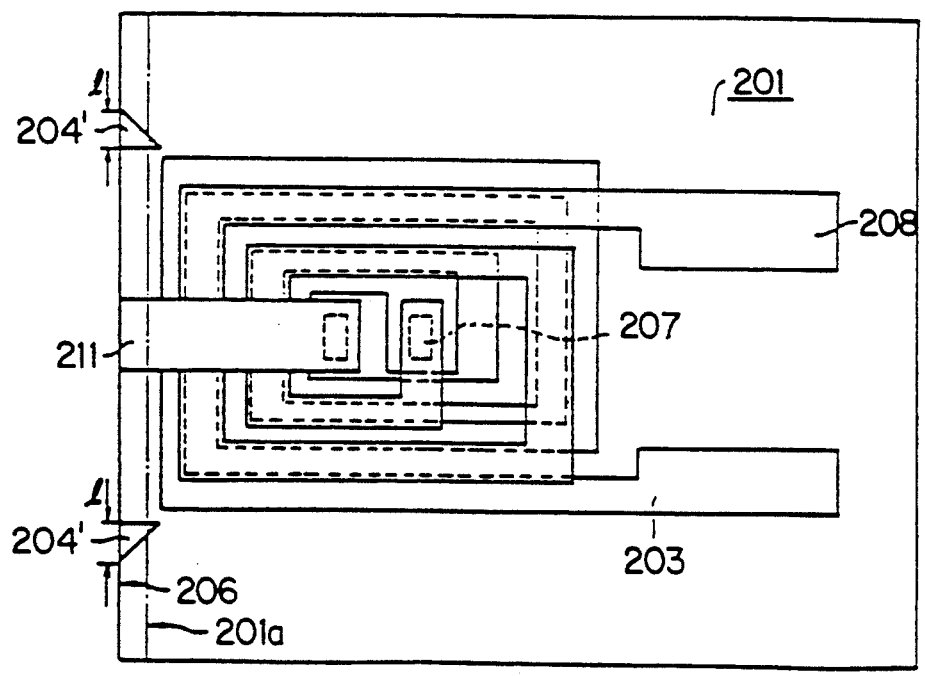
FIG. 8 is a schematic plan view, similar to FIG. 5, showing a conventional thin-film magnetic head.
Figure 9:
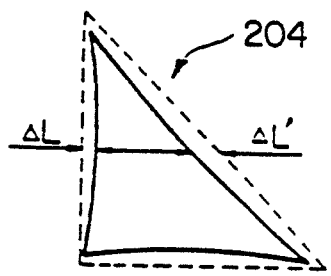
FIG. 9 is an enlarged plan view showing a conventional depth marker.

The discussion now turns to further embodiments of the thin-film magnetic head according to the present invention. These embodiments focus particularly on depth markers, as described with respect to FIG. 8, above.

A lower magnetic layer, insulating layers, a coil conductor layer and an upper magnetic layer are formed step by step. A magnetic gap layer extending as far as the facing surface of the magnetic head is provided between the lower magnetic layer and the upper magnetic layer. A depth marker extending as far as the facing surface is formed on the head surface and has a contour of a polygon having four or more apices, of which two apices or edges disposed remote from the facing surface each include an internal angle sufficiently larger than the usual angle of apex of a triangle (60° for a regular triangle), preferably 90° or larger, with the bottom side of the polygon lying on the facing surface and with two sides neighboring to the bottom side running nonparallel to each other.

The thin-film magnetic head of the present invention may be produced from a semi-product or an intermediate product in which a lower magnetic layer, insulating layers, a coil conductor layer and an upper magnetic layer are formed step by step, a magnetic gap layer is provided between the lower magnetic layer and the upper magnetic layer, and in which an original depth marker for determining the amount of the depth of the magnetic head is formed on the surface of the intermediate product of the magnetic head. The original depth marker has a contour of a polygon having four or more apices of which two disposed remote (i.e., rear) from the outer end, of the intermediate product of the head, corresponding to the facing surface of the magnetic head include internal angles sufficiently larger than the apex of a usual triangle (preferably larger than 90°). A tolerance or margin to be cut-off for the depth marker is provided in a head tolerance or margin extending in contiguity to the facing surface (which is produced later by machining). Lines of extension of two sides of the depth marker which intersect the facing surface and which run nonparallel to each other form the tolerance to be cut-off for the depth marker.

The thin-film magnetic head of the present invention may be produced according to a process comprising:

providing a semi-product or an intermediate product in which a lower magnetic layer, insulating layers, a coil conductor layer and an upper magnetic layer are formed step by step, a magnetic gap layer is provided between the lower and upper magnetic layers;

providing an original depth marker adapted for determining the amount of the gap depth and having a contour of a polygon corresponding to a triangle having at least one apex thereof cut off is formed on the surface of the semi-product; and machining the outer end of the semi-product by a predetermined amount through measuring the length of a part of the marker.

In this manner the facing surface is formed with a defined gap depth. Preferably, the apex or apices thus eliminated are located at a position remote from the outer end of the intermediate product directed to the facing surface of the finished magnetic head, and the resultant side thus formed by elimination of the apex thereof usually forms a straight line. Alternatively, it may also be arcuated gradually.

Preferably, the width of the depth marker in a direction parallel to the facing surface is increased or decreased gradually as the distance from the outer end increases until reaching an arbitrary (but usually predetermined) plane disposed between the facing surface and the reference position.

More preferably, the width of the marker edge lying on the surface being ground is measuring to determine the amount (depth) of grinding, lapping or like processing (generally termed as "machining").

It is noted that the edge angle of the depth marker means an angle defined between two neighboring sides or between extensions thereof. Thus, the side formed by elimination of apex may be arcuate in contour.

The (original) depth marker of the predetermined contour and the tolerance or margin therefor can be formed with a higher accuracy at a desired position without being adversely affected by errors caused by inaccuracies in the resist patterning or pattern etching. Thus, the amount of the depth of the magnetic gap can be calculated based only on the measured length of the bottom side of the depth marker lying on the facing surface of the thin-film magnetic head.

With the above described method for producing the thin-film magnetic head, if the width of the depth marker as measured in the direction parallel to the facing surface is continuously increased or decreased at least from the facing surface as far as a given plane taken arbitrarily between the facing surface and the reference position, the width of the depth marker is directly correlated with the depth of the gap at least within the range between the facing surface and the arbitrary plane. Thus, the amount of the depth may be calculated by measuring the width of the depth marker at least within the above range. Preferably, the above-mentioned reference position is a straight line or flat plane. In producing the magnetic head, the width of the depth marker is controlled to control the amount of the depth.

In the above-mentioned method for producing the thin-film magnetic head, the width of the marker end lying on the facing surface being ground can be measured to determine the amount of grinding to enable precision grinding of the facing surface as well as to enable automation of the grinding process.

By referring to the Drawings, a thin-film magnetic head having a depth marker according to the above-noted preferred embodiments of the present invention will be explained in more detail.

Figure 5:
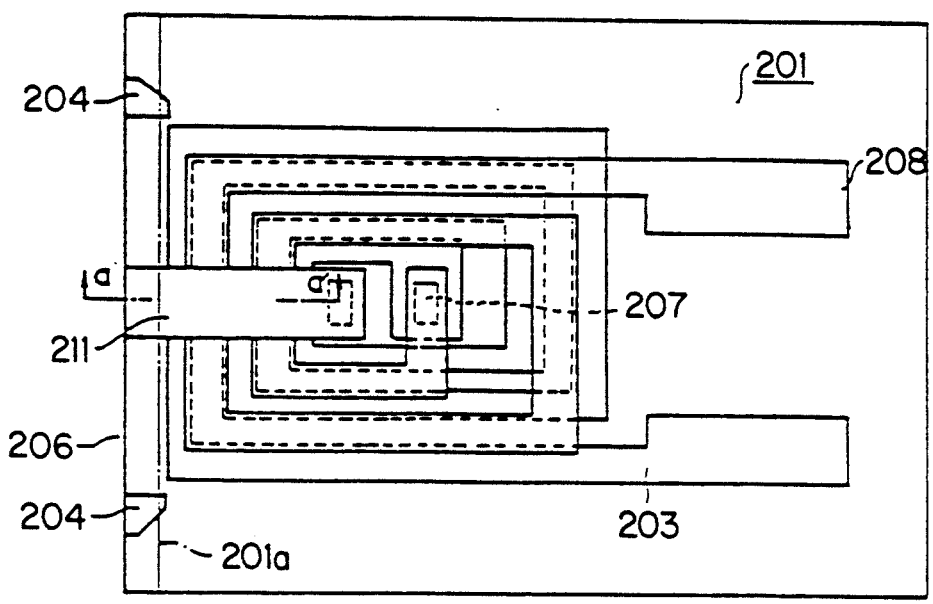
FIG. 5 is a schematic plan view showing an embodiment of a thin-film magnetic head according to the present invention.
Figure 6:
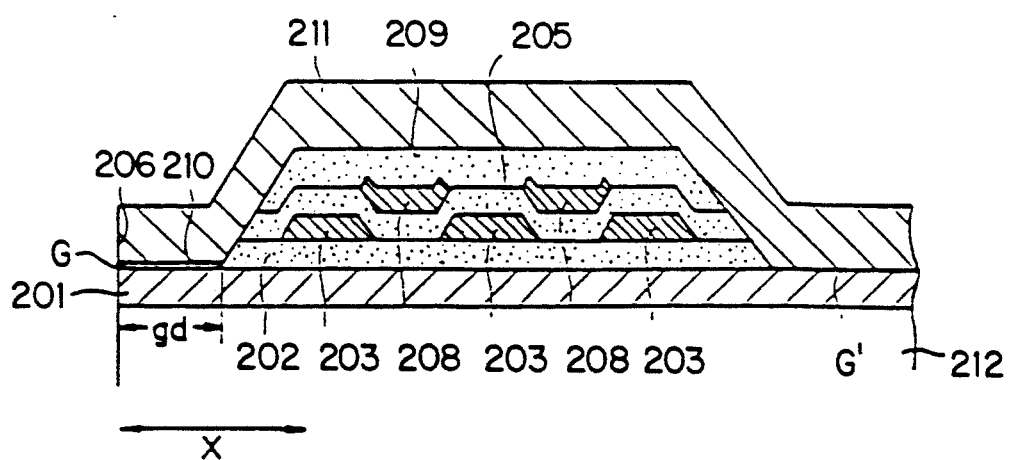
FIG. 6 is a longitudinal cross-sectional view taken along line a—a' in FIG. 5.

Referring to FIGS. 5 and 6, on a surface of a lower magnetic layer 201 formed on a substrate 212 of the thin-film magnetic head except a front gap G and a rear gap G' is formed a first insulating layer 202 formed of, for example, $SiO_2$.

The lower magnetic layer 201 may be a composite substrate constituted by a layer of a ferromagnetic metal, such as Fe—Ni based alloy (permalloy), Fe—Al—Si based alloy (sendust) or amorphous alloy formed on a substrate of ferromagnetic oxide, such as Mn—Zn ferrite or Ni—Zn ferrite, or of a non-magnetic material, such as ceramics.

On the first insulating layer 202 is formed a first coil conductor layer 203, formed by a metal conductor layer of, for example, Cu or Al, by pattern etching to a spiral shape of a plurality of, herein three, turns, separated by a predetermined distance from each other.

It is noted that, in the present embodiment, a depth marker 204, adapted for detecting the amount of the depth, is formed in the vicinity of the magnetic gap simultaneously with pattern etching of the first coil conductor layer 203.

A second insulating layer 205 is formed to overlie the first coil conductor layer 203 and a second coil conductor layer 208 having a spiral shape of a plurality of, herein two, turns, is formed on the second insulating layer 205. The second coil conductor layer 208 has the same direction of turns as the first coil conductor layer 203 and is electrically connected with the first coil conductor layer 203 by means of a coil contact window 207 formed throughout the second insulating layer 205.

The coil conductor layers 203 and 208 may be formed in any winding pattern other than in a spiral multilayer winding pattern, such as helical winding pattern.

On the second conductor layer 208 is formed a third insulating layer 209, and in the front gap, a gap spacer 210 of, for example, $SiO_2$, and an upper magnetic layer 211, are formed to provide a predetermined track width. The upper magnetic layer 211 is formed of a ferromagnetic metal material, such as permalloy, sendust or amorphous alloy, and is formed to overlie the third insulating layer 209.

With a driving current supplied to the coil conductor layers 203 and 208, a magnetic circuit is constituted by cooperation of the lower magnetic layer 201 and the upper magnetic layer 211 to provide for magnetic recording and/or reproduction of information signals.

Although not shown, a protective layer of, for example, $SiO_2$, is formed to overlie the upper magnetic layer 211. After the protective layer is flattened, a protective plate of a non-magnetic material, such as ceramics, is melt-bonded to the protective layer by means of an adhesive, such as glass.

In the above-described thin-film magnetic head, by providing the marker of, for example, a pentagonal contour, machining of the amount of the depth of the magnetic gap such as by grinding, may be improved significantly in accuracy.

The (original) depth marker 204 provided in the thin-film magnetic head of the present embodiment is hereinafter explained.

Figure 7:
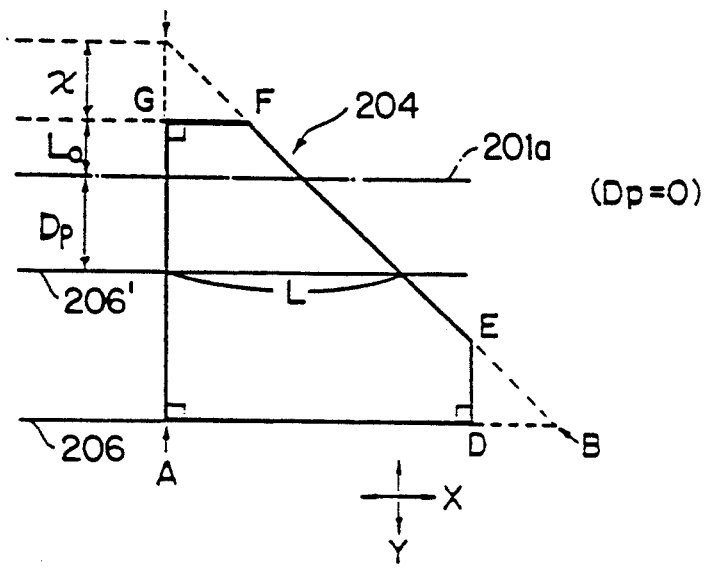
FIG. 7 is an enlarged plan view of a depth marker according to a preferred embodiment of the present invention.

FIG. 7 shows the depth marker 204 of the present embodiment in an enlarged plan view. The marker 204 shown in FIG. 7 is in the form of an original right-angled isosceles triangle ABC, from which a right-angled isosceles triangle BDE having an apex other than the apex including a right angle of the first mentioned triangle as an apex and another right-angled isosceles triangle CGF having the remaining (rear) apex other than the apex including the right angle of the first mentioned triangle as an apex are removed. As a result, the marker (original polygon marker) has a contour of a pentagon ADEFG having three right angles.

In the above marker 204, the side GF is closer to the coil conductor layers 203 and 208 than a rear end 1a of the magnetic gap where the amount of the depth $Dp=0$. In other words, a line for $Dp=0$ is at an arbitrary position intersecting the sides AG and FE of the marker 204.

For detecting the amount of the depth (Dp) in the above marker, machining is progressively performed in the direction shown by an arrow Y by lapping means, such as tape lap, starting from an end surface (facing surface) 206. With the width L of the marker at a finished facing surface 206' the amount of the depth Dp at this time is given by $Dp = L - Lo - \chi$, where Lo is the distance from the rear edge 201a where $Dp=0$ to the line GF and $\chi$ is the length of the line CG.

Thus, by not providing the acute angle as in the marker 204', errors due to subsequent etching may be eliminated to provide for high accuracy detection of the amount of the depth, because the photoresist pattern is not changed due to heat treatment of the photoresist for producing the marker.

As far as the length region of the line DE of the marker 204 is concerned, the amount of the depth may not be determined because the length of the line in the X-direction is not changed as a result of grinding in the Y direction. However, by providing a substantial length of the line EF and selecting the length of the line DE so that the pattern of the marker 204 is not changed, no difficulties are raised in calculating the actual amount of the depth.

Our experiments have shown that the length of the line DE not less than 3 μm is effective to prevent deformation of the pattern of the depth marker. The same may be said of the line GF.

Figure 10:
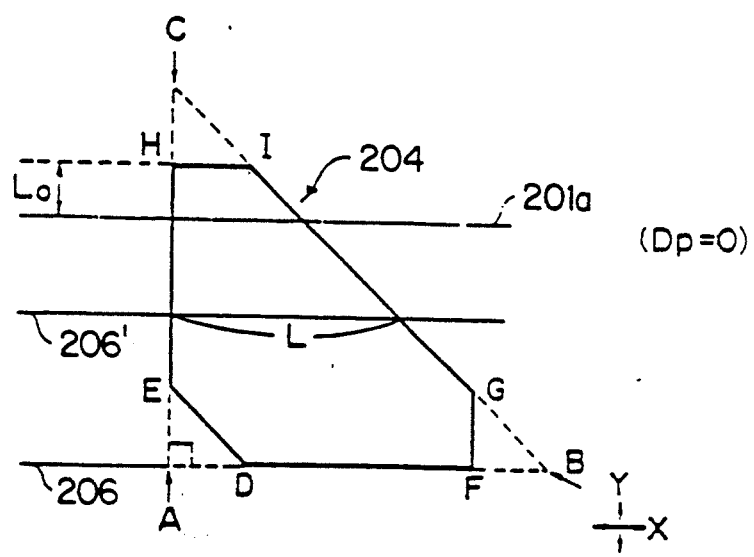
FIGS. 10 to 12 are enlarged plan views, similar to FIG. 7, showing various modifications of the depth marker of the present invention.
Figure 11:
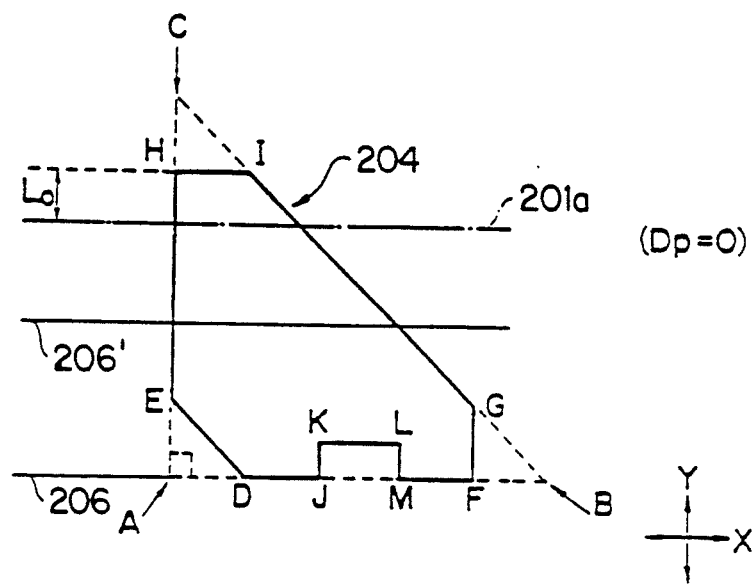

The present invention is not limited to the above embodiment. For example, the original marker may be in the shape of a right-angled isosceles triangle shown in FIG. 10 in which right angled isosceles triangles ADE, BFC and CHI including apices A, B and C are eliminated, or a right angled isosceles triangle as shown in FIG. 11 in which right angled isosceles triangles ADE, BFG, CHI and a rectangle JKLM are removed, in which the amount of the depth of the gap may be calculated from $Dp = L - Lo - \chi$.

Although the foregoing description describes a right angled isosceles triangle from which apex portions are removed, the original marker may also be in the form of a triangle from which the edge portions are removed.

Figure 12:
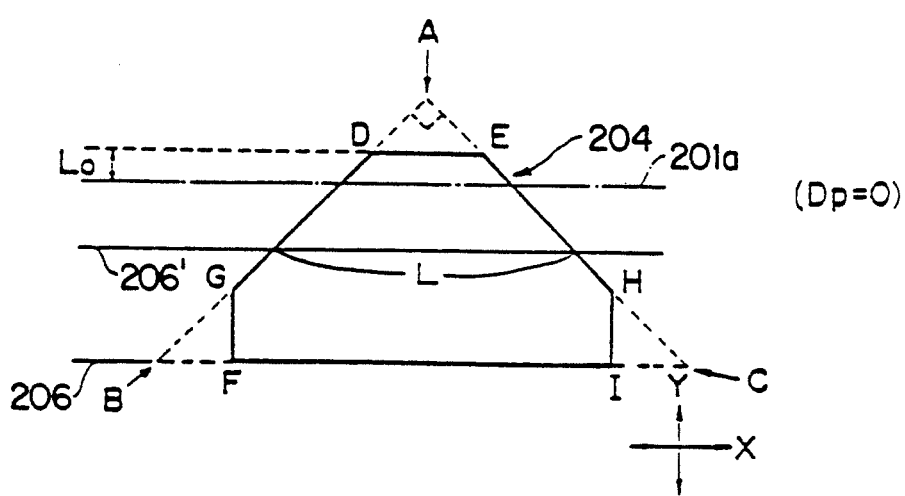

Such a contour may be employed in which, as shown in FIG. 12, the amount of the depth may be calculated from $Dp = \frac{1}{2} L - Lo - y$, where y is the distance between point A and the line DE. Although the marker 204 is formed simultaneously with the first coil conductor layer 203, it may also be formed simultaneously with the second coil conductor layer 208.

Although two markers 204 are used in the present embodiment, similar effects may be obtained using only one marker.

Finally, although there are two coil conductor layers in the above embodiment, similar effects may be obtained with a single coil conductor layer.

As disclosed in the embodiments, the resultant marker, which remains in the finished product, is typically trapezoidal with the non-acute-angle apices on the rear side.

It should be noted that modifications apparent in the art may be made without departing from the gist and scope herein disclosed and claimed hereinbelow.

What is claimed is:

1. A thin-film magnetic head comprising a lower magnetic layer, at least one coil conductor layer disposed over said lower magnetic layer, an upper magnetic layer disposed over said coil conductor layer and constituting a magnetic circuit in cooperation with said lower magnetic layer, and insulating layers interposed between each of said layers to insulate said layers one from the other, and further comprising a marker for determining the amount of the depth of a magnetic gap of the magnetic head, said marker consisting essentially of a single layer shaped in the form of a polygon, the polygon's shape corresponding to a triangle that has had one or more of its apex regions, including a remote apex, removed along an arc of a circle or along a straight line, whereby one side of the polygon is formed by a facing surface of the magnetic head and the remote apex is disposed within the magnetic gap and remote from the facing surface.

2. The thin-film magnetic head as defined in claim 1, wherein said marker has an exposed side formed by the facing surface, whereby the length of the exposed side is proportional to the depth of the magnetic gap.

3. The thin-film magnetic head as defined in claim 2, wherein two non-adjacent sides of the polygon each intersect a reference line that extends substantially parallel to the facing surface and is defined by an end of the magnetic gap remote from the facing surface.

4. The thin-film magnetic head as defined in claim 3, wherein the polygon is shaped as a right-angled isosceles triangle from which two acute-angle apex regions have been removed.

5. The thin-film magnetic head as defined in claim 4, wherein the two acute-angle apex regions removed from the triangle each have right-angled triangle shapes.

6. The thin-film magnetic head as defined in claim 4, wherein the polygon is shaped as the isosceles triangle from which a right-angle apex region has also been removed.

7. The thin-film magnetic head as defined in claim 3, wherein the polygon is shaped as an isosceles triangle from which three apex regions have been removed.

8. The thin-film magnetic head as defined in claim 2, wherein the polygon has a side extending substantially parallel to a reference line defined by an end of the magnetic gap remote from the facing surface.

9. The thin-film magnetic head as defined in claim 4, wherein equilateral sides of the triangle extend towards the remote end of the marker.

10. The thin-film magnetic head as defined in claim 5, wherein the polygon has at least one side substantially perpendicular to the reference line defined by the remote end of the magnetic gap and forming a right angle with at least one adjacent side.

11. The thin-film magnetic head as defined in claim 10, wherein the exposed side extends substantially parallel to the reference line.

12. The thin-film magnetic head as defined in claim 1, wherein said marker is trapezoidal in shape.

13. The thin-film magnetic head as defined in claim 1, wherein said marker is formed of the same layer as is the coil conductor layer.

14. A semi-product of a thin-film magnetic head comprising a lower magnetic layer, at least one coil conductor layer disposed over said lower magnetic layer, an upper magnetic layer disposed over said coil conductor layer and constituting a magnetic circuit in cooperation with said lower magnetic layer, and insulating layers interposed between each of said layers to insulate said layers one from the other, and further comprising a marker for detecting the amount of the depth of a magnetic gap of the magnetic head, said marker consisting essentially of a single layer shaped in the form of a polygon, the polygon's shape corresponding to a triangle that has had one or more of its apex regions, including a remote apex, removed along an arc of a circle or along a straight line, whereby one shank of the polygon is formed by a facing surface of the magnetic head and the remote apex is disposed within the magnetic gap and remote from the facing surface.

* * * * *